United States Patent
Lassonde et al.

(10) Patent No.: US 12,406,424 B2
(45) Date of Patent: Sep. 2, 2025

(54) AUTO-GENERATED SHADER MASKS AND PARAMETERS

(71) Applicant: Sony Interactive Entertainment LLC, San Mateo, CA (US)

(72) Inventors: Gabriel Lassonde, Montreal (CA); Joseph Logan Olson, San Mateo, CA (US); Olivier Carignan, Montreal (CA)

(73) Assignee: Sony Interactive Entertainment LLC

( * ) Notice: Subject to any disclaimer, the term of this patent is extended or adjusted under 35 U.S.C. 154(b) by 340 days.

(21) Appl. No.: 17/938,327

(22) Filed: Oct. 5, 2022

(65) Prior Publication Data
US 2024/0119655 A1    Apr. 11, 2024

(51) Int. Cl.
*G06T 15/00*    (2011.01)
*A63F 13/52*    (2014.01)
*G06T 11/00*    (2006.01)

(52) U.S. Cl.
CPC ............ *G06T 15/005* (2013.01); *A63F 13/52* (2014.09); *G06T 11/001* (2013.01)

(58) Field of Classification Search
CPC ....... G06T 15/005; G06T 11/001; A63F 13/52
See application file for complete search history.

(56) References Cited

U.S. PATENT DOCUMENTS

| | | |
|---|---|---|
| 2002/0015536 A1 | 2/2002 | Warren et al. |
| 2003/0190589 A1 | 10/2003 | Lechner |
| 2017/0132769 A1 | 5/2017 | Barron et al. |
| 2019/0355154 A1 | 11/2019 | Batra et al. |
| 2023/0334733 A1* | 10/2023 | Zou ........................ G06T 11/203 |

OTHER PUBLICATIONS

"International Search Report and Written Opinion", dated Feb. 2, 2024, from the counterpart PCT application PCT/US23/75877.

* cited by examiner

*Primary Examiner* — Chong Wu

(74) *Attorney, Agent, or Firm* — Kilpatrick Townsend & Stockton LLP

(57) ABSTRACT

A graphics shader takes in two grayscale images (called "masks") and four colors and generates a full-color image. The logic behind the shader is two-fold. First, separating the colors from the image enables a greater variety of images (for example, change one color to get different colored brick walls), and secondly, two grayscale masks take up less space in memory than a full-color image. A script that uses differentiable programming and gradient descent "finds" the masks and colors for a target image.

20 Claims, 5 Drawing Sheets

AUTO-GENERATED SHADER MASKS AND PARAMETERS

FIELD

The present application relates generally to automatically generated shader masks and parameters.

BACKGROUND

As understood herein, computer simulations such as computer games use shaders, which are software programs, to fill in game objects with color and texture. As also understood herein, with greater game graphics sophistication, memory space and processing time for shading operation loom increasingly important.

SUMMARY

Accordingly, a device includes at least one computer storage that is not a transitory signal and that in turn instructions executable by at least one processor to receive first and second grayscale images and combine with the grayscale images with plural colors to render a test image. The instructions are executable to use gradient descent to alter the test image and output a final color image based at least in part on a loss indication associated with the gradient descent.

The first and second grayscale images may be based on a common image, i.e., may be two different grayscale versions of the same image. Or, the first and second grayscale images may not be based on a common image.

In some examples, the instructions can be executable to combine the grayscale images with four colors to render the test image. The instructions can be embodied in a machine learning (ML) model and/or a shader. In non-limiting implementations the instructions are executable to output the final color image to a computer simulation for display thereof during play of the computer simulation.

In another aspect, an apparatus includes at least one processor programmed with instructions to identify at least first and second grayscale images and combine with the grayscale images with at least one color to render a test image. The instructions are executable to use gradient descent to alter the test image and output a final color image based at least in part on a loss indication associated with the gradient descent.

In another aspect, a method includes receiving a first grayscale image, receiving a second grayscale image, and receiving at least one color. The method includes outputting a test image based at least in part on the grayscale images and the color. The method further includes applying gradient descent to minimize a loss function to alter the test image until a final image is generated, and outputting the final image to a computer simulation.

The details of the present application, both as to its structure and operation, can be best understood in reference to the accompanying drawings, in which like reference numerals refer to like parts, and in which:

DETAILED DESCRIPTION

Figure 1:
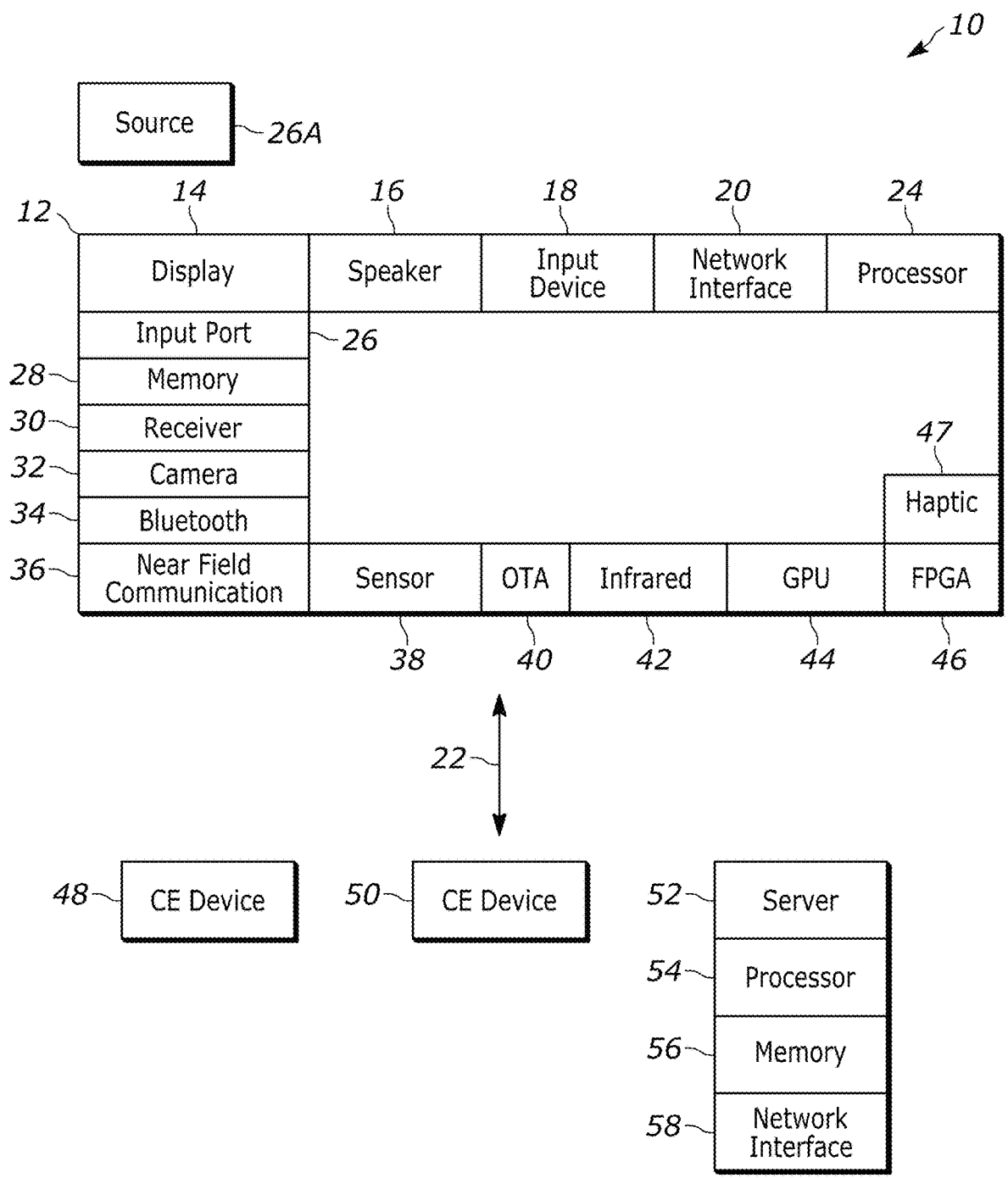
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth© transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
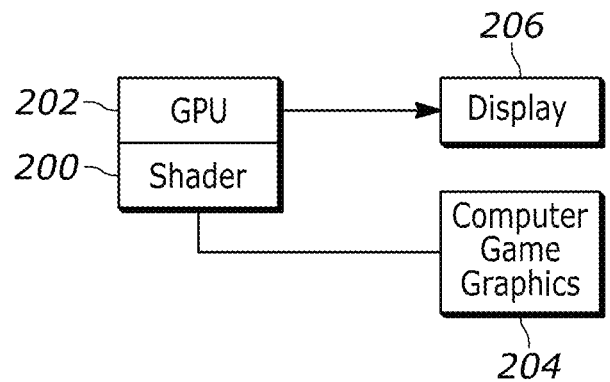
FIG. 2 illustrates an example hardware architecture.

FIG. 2 illustrates a graphics shader 200 that can be executed by a GPU 202 to shade graphics from a source 204 of computer game graphics such as a computer game console or server for presentation on a display 206.

Figure 3:
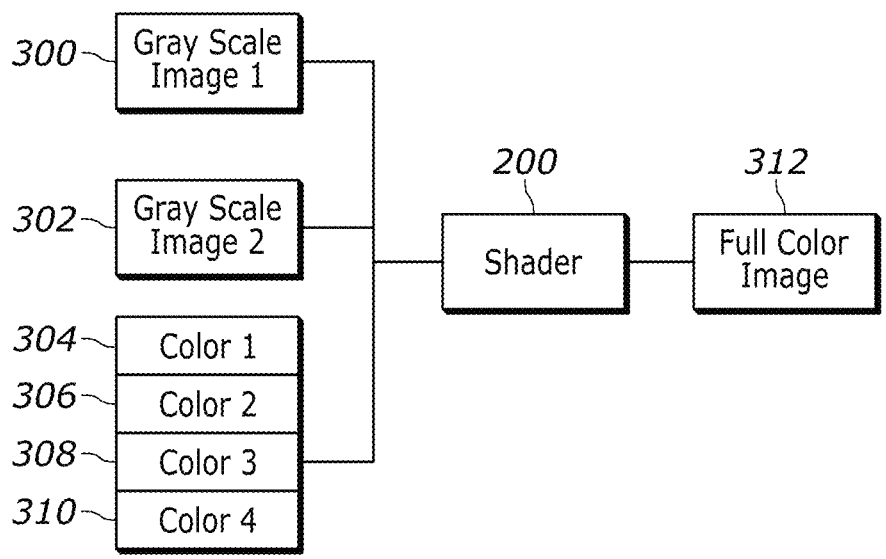
FIG. 3 illustrates an example software architecture.

As depicted in FIG. 3, the shader 200 takes in two grayscale images (called "masks") 300, 302 and four colors 304, 306, 308, 310 and generates a full-color image 312 from the input. The four colors 304, 306, 308, 310 may be, e.g., red, green, blue, and yellow. The logic behind the shader 200 is two-fold. First, separating the colors from the image enables a greater variety of images (for example, change one color to get different colored brick walls), and secondly, two grayscale masks take up less space in memory than a full-color image.

Figure 4:
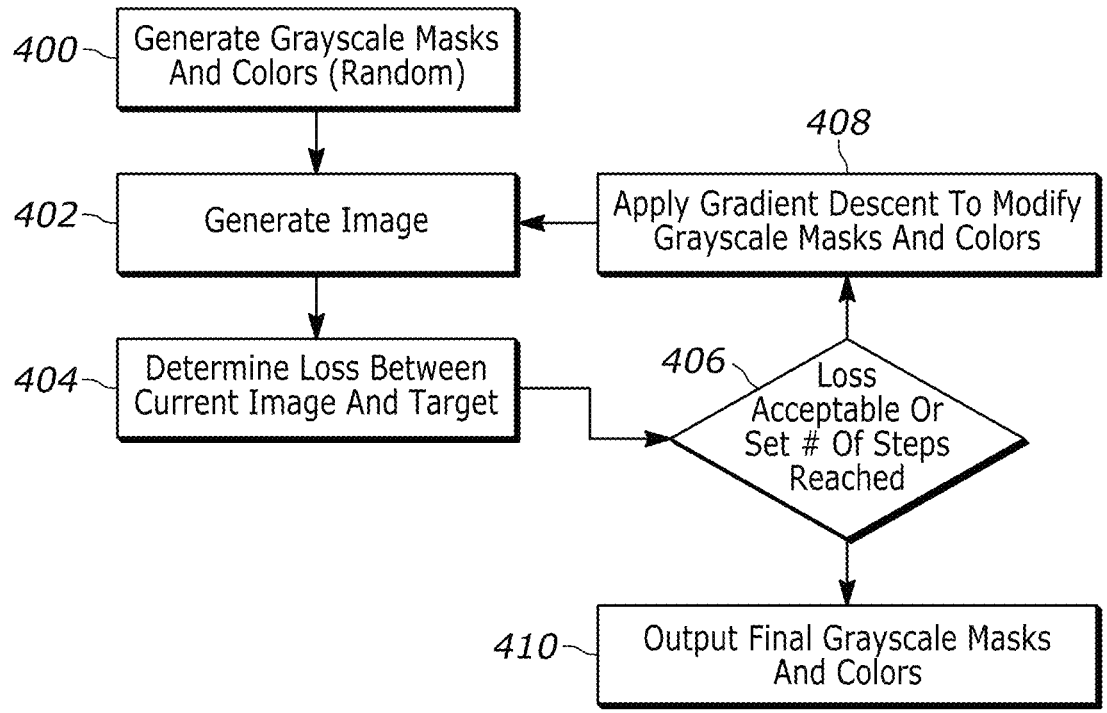
FIG. 4 illustrates example logic consistent with present principles.

A script that uses differentiable programming and gradient descent "finds" the masks and colors for a target image. FIG. 4 illustrates example logic that such a script may implement.

Commencing at block 400, the two grayscale masks 300, 302 shown in FIG. 3 are generated along with the four colors 304, 306, 308, 310 shown in FIG. 3.

Proceeding to block 402, the logic generates a color image based on the grayscale masks 300, 302 and four colors 304, 306, 308, 310. Next proceeding to block 404, a loss is determined between the current image and a target image, which target may be user-defined. Based on the determined loss, decision diamond 406 indicates that if the determined loss is acceptably small, or if a predetermined number of iterations has been reached, the final grayscale mass and colors are output at block 410. However, if the determined loss is not acceptably small, or if the predetermined number of iterations has not been reached, the logic moves from decision diamond 406 to block 408.

At block 408, gradient descent is applied to modify the grayscale masks and colors, and the logic loops back to block 402 to generate an updated image.

Gradient descent uses calculus to receive as input a loss and determine out how to modify an image to lower the loss. This technique can be used in stochastic gradient descent and as an extension to the backpropagation algorithms that used to train ML models such as the ML models described herein. In the direction of updating, stochastic gradient descent adds a stochastic property. The weights can be used to calculate the derivatives.

Figure 4A:
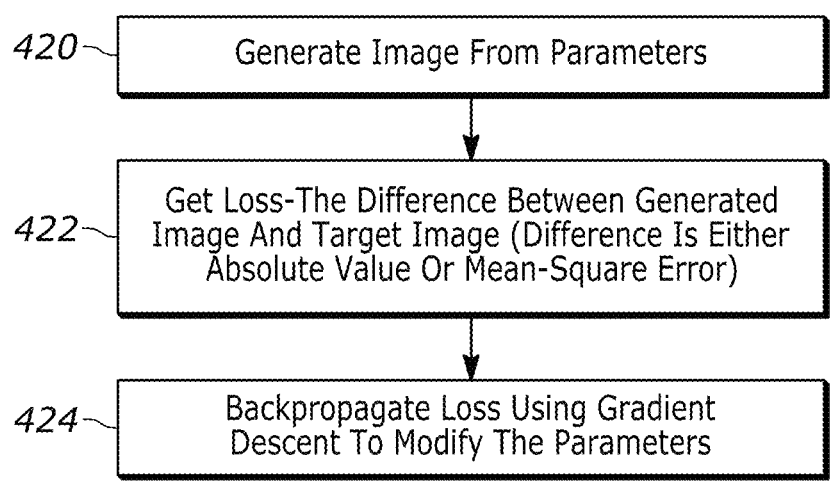
FIG. 4A presents an alternate representation.

FIG. 4A is a representation in which image parameters are generated at block 420. The parameters may be the pixel values of the two grayscale masks and four colors, with three values for each RGB image. Thus, if the grayscale masks are 2000×20000 pixels, the total number of parameters are 2000×2000×2+4×3 parameters. Generating the image from the parameters means doing the same calculations the shader is doing. In pseudocode:

a=lerp(color_0, colors_1,mask_0)
b=lerp(color_2, colors_3,mask_0)
generated_image=lerp(a,b,mask_1)

Proceeding to block 422, loss is obtained. The loss is the difference between the generated image and a target image (difference is either an absolute value or a mean-square error.) Then, at block 424 the loss is back-propagated using gradient descent to modify the parameters at block 420. The user may determine how many times the cycle is repeated, e.g., one thousand to six thousand cycles.

Figure 5:
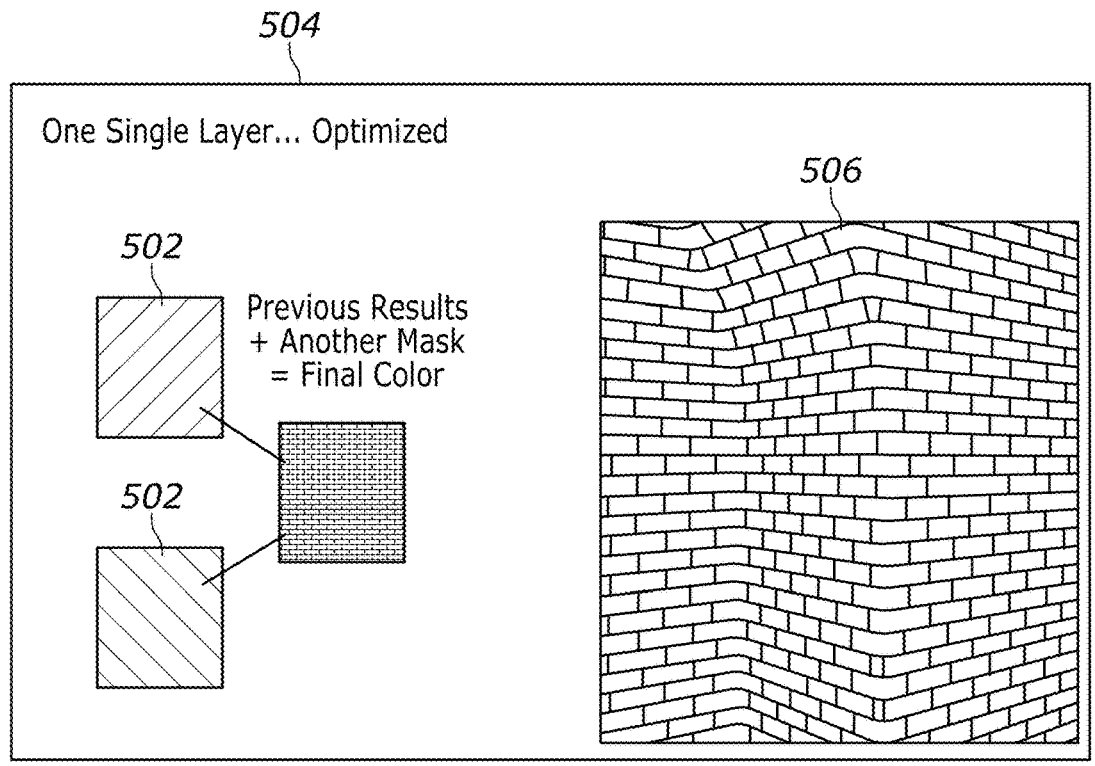
FIGS. 5-7 present screenshots graphically illustrating present principles.
Figure 6:
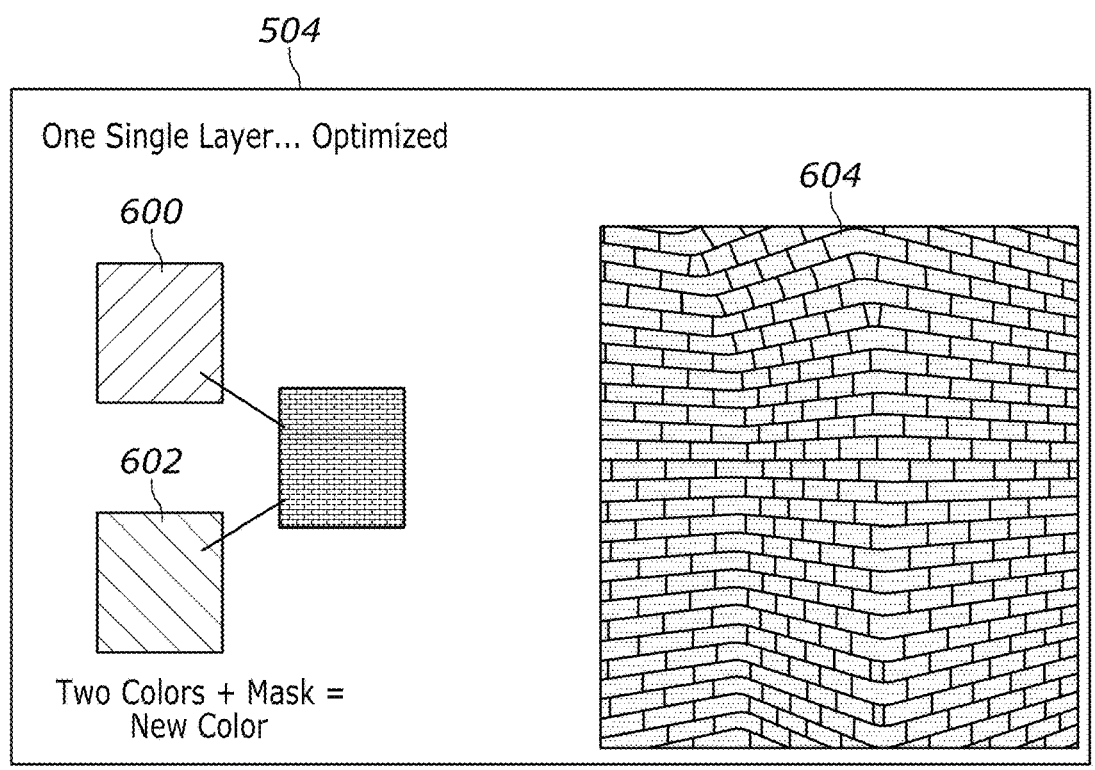

FIGS. 5 and 6 illustrate further. In FIG. 5, two grayscale masks 500, 502 are applied to previous results plus another mask to render a final color image 504, shown enlarged at 506. In FIG. 6, two colors 600, 602 are combined with the final color 504 from FIG. 5 to render a new color image 604.

Figure 7:
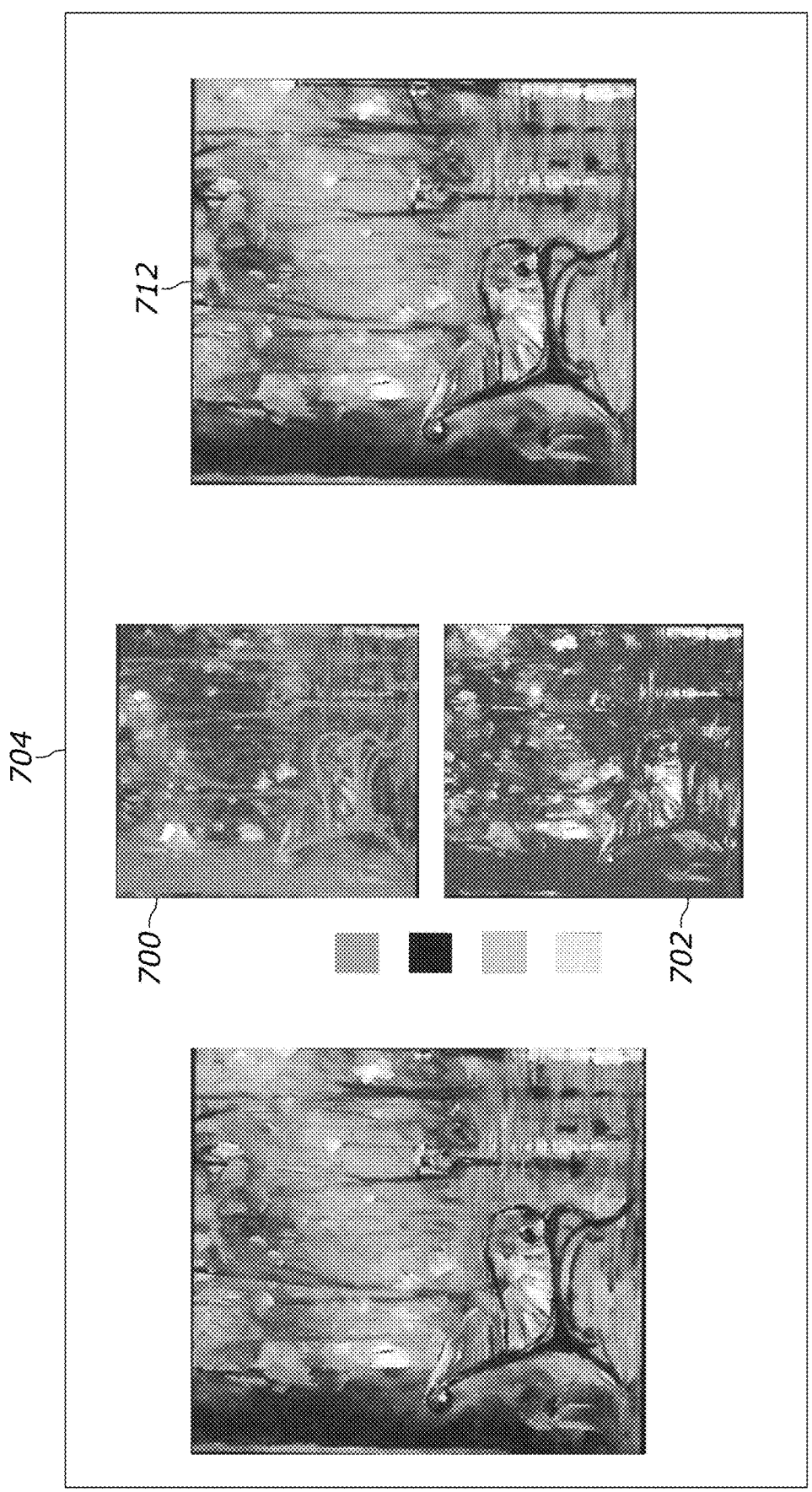

FIG. 7 illustrates two grayscale asks 700, 702, which essentially are two different grayscale versions of the same image, combined with four colors 704 (in the example shown, red, black, yellow, and blue) to render a final color image 712.

The tools and techniques above may be provided in end user game computing devices such as computer game consoles so that end user game players can use the tools described herein in game (i.e., as part of playing a computer game) to create and/or modify game objects for each other.

While the particular embodiments are herein shown and described in detail, it is to be understood that the subject matter which is encompassed by the present invention is limited only by the claims.

What is claimed is:

1. A device comprising:
   at least one computer storage that is not a transitory signal and that comprises instructions executable by at least one processor to:
      receive a first grayscale image and a second grayscale image;
      combine the first and second grayscale images with a plurality of colors to render a test image;
      determine a loss function based at least in part on a difference between the test image and a user-defined target image;
      use gradient descent to minimize the loss function to alter the test image; and
      output a final color image based at least in part on the gradient descent.

2. The device of claim 1, wherein the first and second grayscale images are based at least in part on a common image.

3. The device of claim 1, wherein the first and second grayscale images are not based on a common image.

4. The device of claim 1, wherein the instructions are executable to:
   combine the first and second grayscale images with four colors to render the test image.

5. The device of claim 1, wherein the instructions are embodied in a machine learning (ML) model.

6. The device of claim 1, wherein the instructions are embodied in a shader.

7. The device of claim 1, wherein the instructions are executable to output the final color image to a computer simulation for display thereof during play of the computer simulation.

8. The device of claim 1, comprising the at least one processor.

9. An apparatus comprising:
   at least one processor programmed with instructions to:
      identify at least a first grayscale image and a second grayscale image;
      combine the first and second grayscale images with at least one color to render a test image;
      determine a loss function based at least in part on a difference between the test image and a user-defined target image;
      use gradient descent to minimize the loss function to alter the test image; and
      output a final color image based at least in part on the gradient descent.

10. The apparatus of claim 9, wherein the first and second grayscale images are based at least in part on a common image.

11. The apparatus of claim 9, wherein the first and second grayscale images are not based on a common image.

12. The apparatus of claim 9, wherein the instructions are executable to:
    combine the first and second grayscale images with four colors to render the test image.

13. The apparatus of claim 9, wherein the instructions are embodied in a machine learning (ML) model.

14. The apparatus of claim 9, wherein the instructions are embodied in a shader.

15. The apparatus of claim 9, wherein the instructions are executable to output the final color image to a computer simulation for display thereof during play of the computer simulation.

16. A method comprising:
    receiving, by a processor, a first grayscale image;
    receiving, by the processor, a second grayscale image;
    receiving, by the processor, at least one color;
    outputting, by the processor, a test image based at least in part on the first and second grayscale images and the at least one color;
    determining, by the processor, a loss function based at least in part on the test image and a user-defined target image;
    applying by the processor gradient descent to minimize the loss function to alter the test image until a final image is generated; and
    outputting, by the processor, the final image to a computer simulation based at least in part on the gradient descent.

17. The method of claim 16, wherein the first and second grayscale images are based at least in part on a common image.

18. The method of claim 16, wherein the first and second grayscale images are not based on a common image.

19. The method of claim 16, wherein the method is embodied in a machine learning (ML) model.

20. The method of claim 16, wherein the method is executed by a shader.

* * * * *